United States Patent [19]

Levy

[11] Patent Number: 5,448,220

[45] Date of Patent: Sep. 5, 1995

[54] APPARATUS FOR TRANSMITTING CONTENTS INFORMATION

[76] Inventor: Raymond H. Levy, 976 Rector Rd., Bridgewater, N.J. 08807

[21] Appl. No.: 44,399

[22] Filed: Apr. 8, 1993

[51] Int. Cl.$^6$ .............................................. G08B 3/10
[52] U.S. Cl. ..................... 340/539; 340/505; 340/584; 340/589; 340/614; 340/825.54; 342/50
[58] Field of Search ............... 340/505, 584, 588, 589, 340/539, 825.54, 585, 591, 614, 617, 620, 632; 342/44, 50

[56] References Cited

U.S. PATENT DOCUMENTS

| | | | |
|---|---|---|---|
| 3,961,323 | 6/1976 | Hartkorn | 340/539 |
| 4,028,688 | 6/1977 | Goleman | 340/585 |
| 4,278,841 | 7/1981 | Regennitter et al. | 340/585 |
| 4,835,522 | 5/1989 | Andrejasich et al. | 340/521 |
| 4,924,210 | 5/1990 | Matsui et al. | 340/505 |
| 4,970,496 | 11/1990 | Kirkpatrick | 340/586 |
| 5,008,661 | 4/1991 | Raj | 340/825.54 |
| 5,099,226 | 3/1992 | Andrews | 340/505 |

FOREIGN PATENT DOCUMENTS 6230980 2/1987 Japan .................. 340/825.54

*Primary Examiner*—Jeffery A. Hofsass
*Assistant Examiner*—Daniel J. Wu
*Attorney, Agent, or Firm*—Plevy & Associates

[57] ABSTRACT

An system is provided which, in one embodiment, utilizes an identification unit to identify the contents of a container and to transmit a coded identification signal to a remote receiver unit, thereby allowing emergency personnel or other interested persons to ascertain the contents of the container at an accident site. The identification unit includes a sensor positioned within the storage cavity of the container to detect whether a predetermined unsafe temperature or pressure condition exists therein. If the condition is detected, a coded identification signal, which may be in 8-bit binary form, is generated and transmitted. In an alternate embodiment, the identification unit is modified to answer an interrogation signal transmitted by a remote interrogation device when the interrogation signal corresponds to the material stored in the associated container.

15 Claims, 3 Drawing Sheets

APPARATUS FOR TRANSMITTING CONTENTS INFORMATION

BACKGROUND OF THE INVENTION

This invention relates generally to a system and method for communicating information between one or more sensors and at least one receiver or station at which a person may obtain information regarding the contents of one or more containers, and more particularly to a system which allows fire fighters, rescue workers, and other emergency personnel to identify, from a remote location, the specific hazardous substance stored in each container, thereby allowing the risk of explosion, contamination, or other uncontrolled release of hazardous substances to be quickly and safely evaluated at an accident site.

An important requirement in transporting hazardous materials such as flammable or corrosive substances, is that both the containers and the vehicles transporting them be clearly and conspicuously labelled to identify the dangerous properties of the cargo within. In the case of over-the-road transportation, the labelling allows regulatory personnel to determine whether the vehicle driver has selected an improper route (such as through a tunnel where vehicles carrying hazardous materials are not permitted) or prompts them to verify that all applicable safety procedures have been taken. In the case of accident or fire, conspicuous labelling further alerts members of the public as well as emergency personnel arriving at the scene to the elevated risk of physical injury which could result from an explosion or other uncontrolled release of the hazardous substance.

While stringent labelling requirements are obviously a critical element of a safe hazardous material transportation system, however, there are certain limitations which have heretofore remained unaddressed. Specifically, while a "flammable" label on the side of a truck alerts emergency personnel to the risk of fire or explosion, it does not reveal the specific contents of the drums or barrels being transported thereby. Further, where an emergency situation such as a fire exists, it may be inadvisable to venture close enough to the vehicle to read the labels on the drums themselves. The resulting lack of information may force emergency personnel to use procedures reserved for the highest risk situations, even where relatively stable hazardous materials are involved.

Devices for monitoring temperature, pressure or other conditions in a transport container and transmitting data corresponding to said conditions have been proposed in the past. For example, in U.S. Pat. No. 5,095,739 entitled TANK LEAK DETECTOR, which issued on Mar. 17, 1992 to Robert C. Hedtke, there is proposed a system which utilizes a pressure sensitive transmitter positioned within the tank. The transmitter uses either an absolute pressure sensor or a differential pressure sensor to detect any changes in the liquid level within the tank and transmits an output signal corresponding to the change via an output cable. While the '739 system allows a condition in a transportable container to be monitored from outside the container, it relies on an output cable between the sensor location and the monitoring station and is thus limited in range to the transport carrier itself. Further, the '739 system provides no means for determining the contents of the one or more tanks from a safe distance during a fire or other emergency.

In U.S. Pat. No. 4,882,564 entitled REMOTE TEMPERATURE MONITORING SYSTEM, which issued on Nov. 21, 1989 to Monroe et al, there is disclosed a remote temperature monitoring system for a refrigerated trailer in which a temperature sensor such as a thermistor and transmitter unit are positioned in a transport container and a display receiver unit is provided at a remote location in the cab compartment. The temperature sensor generates an output voltage dependent upon the temperature sensed and a frequency shift keyed output signal is transmitted to a display unit via an output cable. The output signal is received by the display unit, which displays the sensed temperature, and is compared to an alarm limit corresponding to an upper temperature threshold for possible triggering of an alarm in the display unit. Like the '739 system, the range of the '564 system is limited because it relies on an output cable between the sensor in the trailer and the monitoring station. Also, the '564 system is not adapted to permit the contents of one or more trailers to be determined from a remote location.

In U.S. Pat. No. 3,764,984, entitled INFORMATION CODING SYSTEM and issued on Oct. 9, 1973 to James S. McCartney, there is disclosed an information coding system in which a plurality of remote sensing units are monitored by a radio link with a central monitoring station. Each sensing unit is adapted to monitor a condition such as temperature, power loss, or unauthorized entry and to generate an alarm signal when a certain condition occurs. Alarms of each particular type of sensing unit are similarly coded and each sensing unit is adapted to generate a series of marker pulses which uniquely identify the location of that particular unit when it is activated.

SUMMARY OF THE INVENTION

The identification system according to the present invention comprises at least one identification unit positionable within the cavity of a container and adapted to communicate with at least one fixed receiver unit at a central monitoring station and/or with one or more portable receiver units accessible to those personnel requiring information as to the contents of the container.

The identification system preferably comprises means for sensing a condition within the container and means operable in response to the sensing of the condition to generate and transmit an identification signal identifying the material to be stored in the container. If desired, however, the sensing means may be omitted and the transmitting means may be operable to constantly transmit a signal identifying the contents of the container.

The sensing means of each identification unit are operable to energize the generating means when the temperature and/or the pressure in the container exceeds a predetermined limit or rises at a rate greater than a predetermined rate. If desired, the predetermined temperature or pressure limit may be selected based upon the type of material being stored in the container so that the identification signal is only transmitted when conditions inside the container make it unsafe to approach it.

Preferably, the identification unit comprises means for sealing the dispensing opening of the container and the sensing means is coupled to the sealing means so that it is positioned in the cavity when the sealing means is positioned in the dispensing opening. To ensure a tight seal of the container, the sealing means is configured as a plug and has a threaded exterior which is adapted to engage corresponding threads on the sidewall of the container opening.

The generating means preferably includes encoder means for storing a binary code label corresponding to the material being stored in the container. It is also preferred that the encoder means be adapted to provide a binary code signal corresponding to the binary code label. The binary code signal is then modulated to provide the identification signal which is then transmitted by radio or other means.

DETAILED DESCRIPTION OF THE INVENTION

Figure 1:
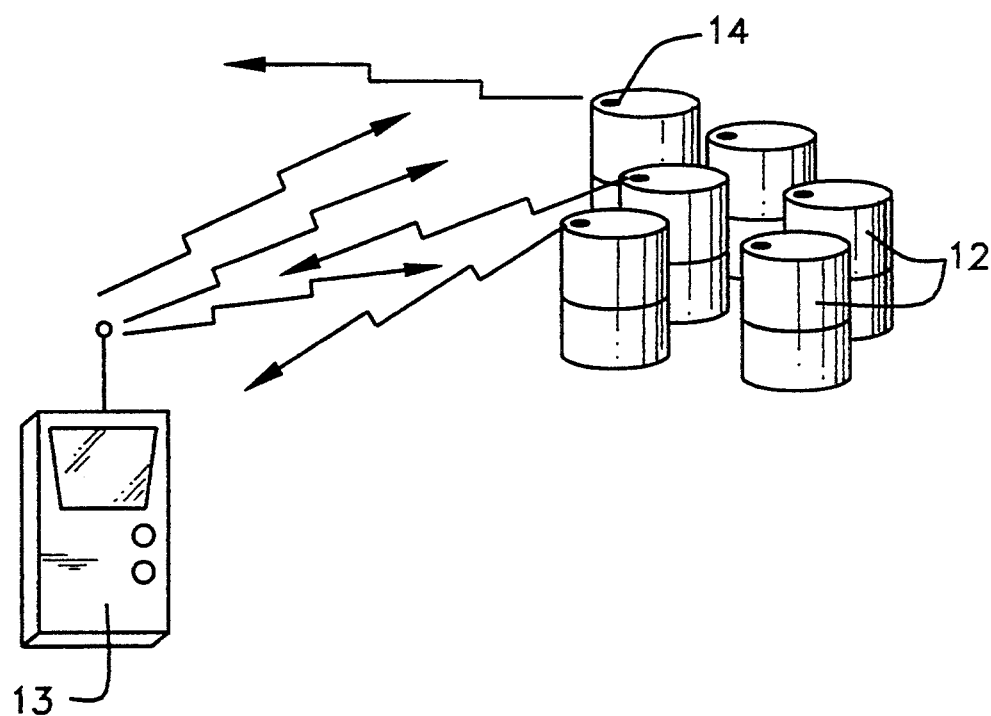
FIG. 1 shows a plurality of transportable containers each including an identification unit adapted to correspond with a remote transmitter/receiver in accordance with the present invention.

Referring now to FIG. 1, the identification unit 10 of the present invention may be advantageously utilized to transmit a signal identifying the material 11 stored within a transportable container such as a drum 12. As desired, the identification unit may transmit the material identifying signal continuously, upon the receipt of an interrogatory signal from a portable transmitter/receiver unit 13, or when a predetermined condition has been sensed inside the drum.

In the illustrated embodiment, the identification unit 10 is provided within a bung plug 14, which is sealingly positionable within the dispensing opening 16 of the drum. It will, however, be apparent to those of ordinary skill that the identification unit may be utilized to identify substances contained in any type of container (e.g., a tank) and that alternate means of coupling the identification unit to the container may be employed.

Figure 2:
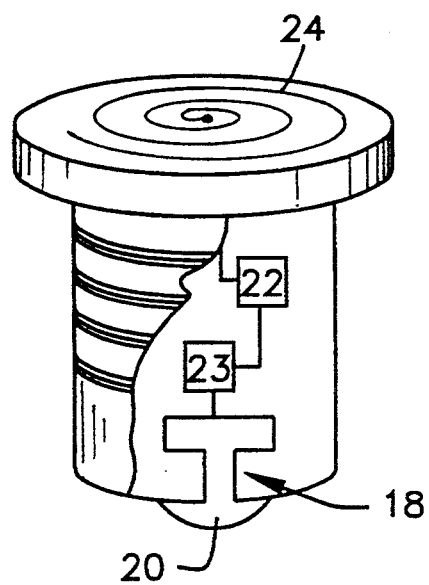
FIG. 2 is a partial sectional view of an identification unit constructed in accordance with one embodiment of the present invention.
Figure 3:
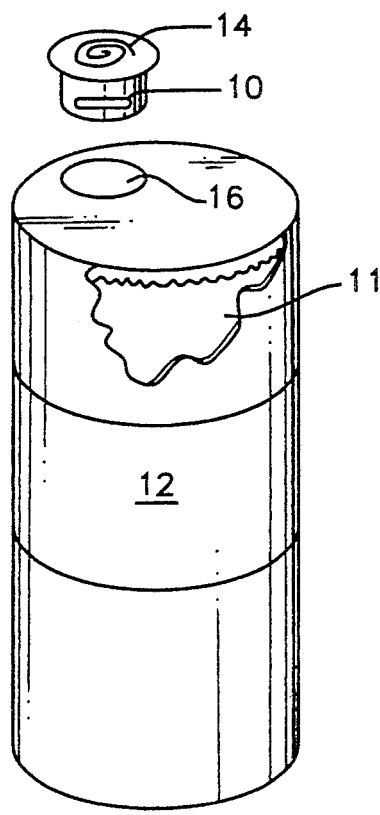
FIG. 3 is a sectional view of a transportable container defining a storage cavity and a dispensing opening in communication therewith dimensioned to receive the identification unit of the present invention.

As more clearly shown in FIG. 2, in order to monitor the condition to be sensed, identification unit 10 includes a sensing means 18 which may comprise a sensing element 20 submergible into the substance being stored in the drum. Alternatively, the sensing element may be constructed so as to operate in a cavity between the drum lid and the surface of the stored substance. If conditions on the exterior surface of the drum are to be monitored, the sensing element might also be positioned on the external surface of plug 14 or on some other surface outside the drum. The plug 14 is inserted into the drum 12 as shown in FIG. 3.

Many of the electrical components of the identification unit may be constructed of GaAs or other suitable semiconductor. It should be readily appreciated that all exposed components of identification unit 10 should therefore be constructed of materials designed to resist corrosion or other damage which may be caused by direct contact with the contents 11 of the container 12. As a further means of extending the life of the unit 10 and protecting the components therein, a coating of a protective compound such as polytetraflouroethylene is preferably applied to all exposed surfaces thereof.

Returning once again to FIG. 2, it should be understood that the applicable safety procedures for handling or otherwise processing hazardous materials at an accident site vary with the particular type of material involved and with the specific conditions present at the site. Accordingly, when emergency personnel first arrive at the scene, there is an immediate need to obtain as much information as possible about the shipment in order to follow the established procedures. Because the danger is often greatest where fire or the threat of fire is involved, the sensing element 20 is preferably a thermistor, a thermocouple, or some other temperature sensitive device which is adapted to energize transmitting means 22 when the temperature inside the container exceeds a predetermined limit or rises faster than a predetermined rate. Alternately, however, the sensing element 20 may also take the form of a pressure sensitive transducer which measures pressure within the container. For maximum safety, sensing means 18 may comprise both temperature and pressure sensing elements each adapted to energize the transmitting means if either measure exceeds a predetermined threshold value.

If desired, the temperature or pressure limits may be selected on the basis of the specific properties of the material contained in the container. For example, the temperature limit might be selected at a specific temperature below the flash point or vaporization temperature of the particular material.

Once the condition or conditions have been sensed, an encoder means 23 is operated in a known manner to generate a coded signal which uniquely identifies the contents of the container. The signal is modulated, amplified and transmitted by transmitting means 22 which includes an antenna 24. Preferably, the identification signal is transmitted in the microwave range (e.g. 600–800 MHz) so that the antenna need only be a few centimeters in length. The antenna may be configured spirally as illustrated or as a dipole type and is preferably protected by a coating of plastic or other suitable material capable of enabling signal propagation therethrough.

Figure 4:
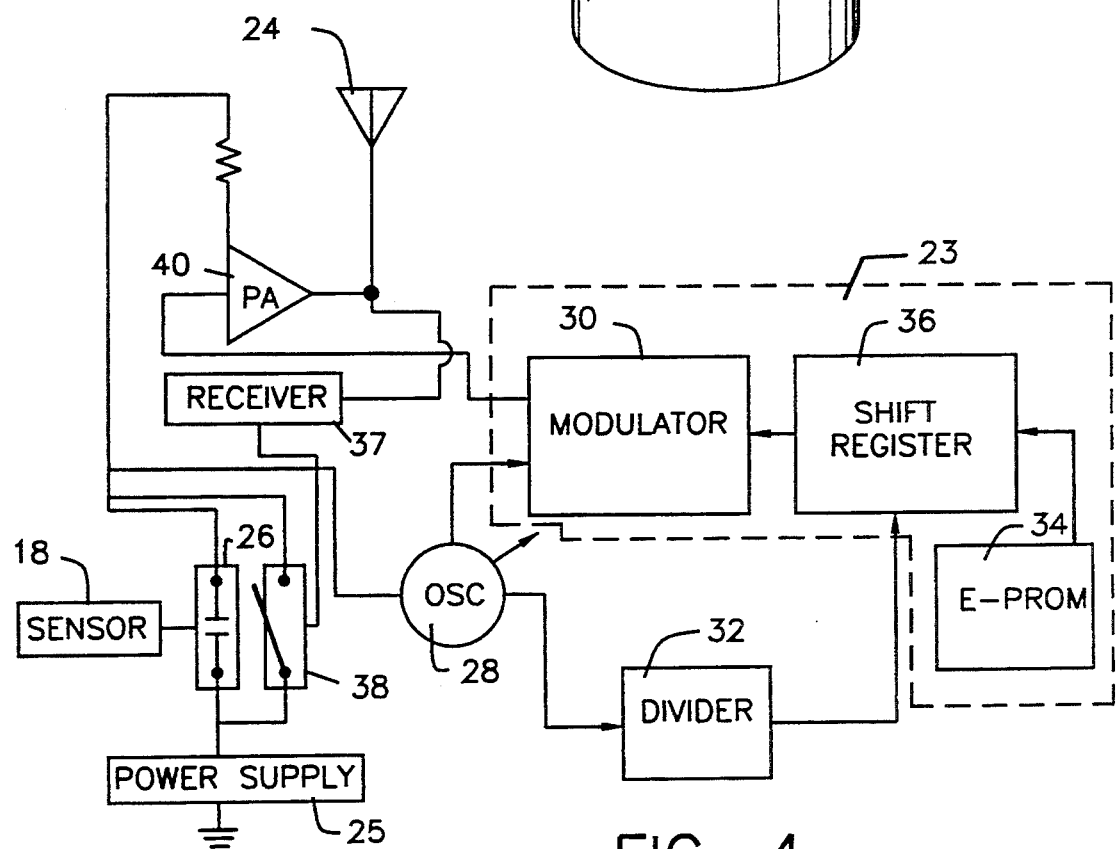
FIG. 4 is a schematic diagram of the components of the identification unit of the embodiment illustrated in FIG. 2.

FIG. 4 illustrates the electronic construction of one embodiment of identification unit 10. A suitable power supply 25, such as a battery, is connected to power the system by closure of a normally open contact 26. When the condition is sensed by sensing element 20, contact 26 is closed and power is supplied to an oscillator 28. In a conventional manner, oscillator 28 generates a suitable carrier frequency, for example 800 MHz, which is supplied to modulator 30 and to the encoder means 23, which in the illustrated embodiment comprises a divider 32, an IC chip 34, and a shift register 36.

Under certain circumstances, it may be desired that the identification unit 10 transmit an identification signal when no emergency condition exists. Examples of such instances might include a spot check by regulatory personnel seeking to verify a bill of lading or by highway authorities seeking to prevent certain materials from being transported within a tunnel. It may also be desirable to test the unit 10 from time to time to ensure that it is operating properly. With the system of the present invention, such verifications may be readily performed using a transportable transmitter/receiver unit such as the one indicated in FIG. 1 to transmit a request signal. In the embodiment illustrated in FIG. 4, the identification unit 10 includes a receiver 37 for receiving such a request signal and a contact or switch 38 which is operable in response to the receipt of the request signal to power the system and commence transmission of the identification signal.

In accordance with the aforementioned objective, the identification unit 10 is adapted to transmit a signal which allows emergency personnel, regulatory officials, and others having suitable signal receiving and/or transmitting means to immediately ascertain the type of material stored in container 12. To this end, each type of material to be transported is assigned a specific label. It should, of course, be understood that any suitable coding system which allows each of the various transported or stored materials to be distinguished from one another may be employed. For illustrative purposes only, an 8-bit binary coding system is used. Thus, for example, isopropyl alcohol receives a binary code label of 00000011 while sulfuric acid receives a binary code label of 00010010.

The code corresponding to the material within the container 12 may be provided using any suitable combination of logic devices in a known manner. For ease of manufacture, however, the label code may be supplied by an integrated circuit chip 34. In the illustrated embodiment, an E-PROM chip is used so that the identification unit 10 may be programmed as required for use in the transportation or storage of containers containing different materials.

The E-PROM 34 delivers the binary code corresponding to the material stored in container 12 to shift register 36. Shift register 36 also receives the output of divider 32, and in a well known manner provides a coded signal corresponding to the binary code label to modulator 30. Modulator 30 modulates the coded signal in conjunction with the oscillator frequency to provide an identification signal to power amplifier 40 which is suitable for transmission. Antenna 24 receives the amplified signal from amplifier 38 and broadcasts the same so that it may be received by emergency personnel. As will be readily appreciated by those skilled in the art, the code signal from the shift register of each identification unit may be modulated in frequency or in amplitude, or the identification signal may be pulsed at a different time interval, so that respective identification signals from plural identification units may be separately received and/or distinguished from each other without interference. If desired, an intermediate receiver/transmitter (not shown) may be provided in a nearby location (e.g., in the cab of a trailer hauling a plurality of containers), to receive short range signals transmitted by individual identification units and retransmit them at a higher power level so that they may be received at distant monitoring stations.

It will of course be apparent that the receiver and decoder unit 13, which may be portable or fixed, would be required to receive and decode the modulated identification signal of each identification unit 10. Such receiver units are believed to be well known in the art and for this reason a detailed discussion of the same has been omitted.

Figure 5:
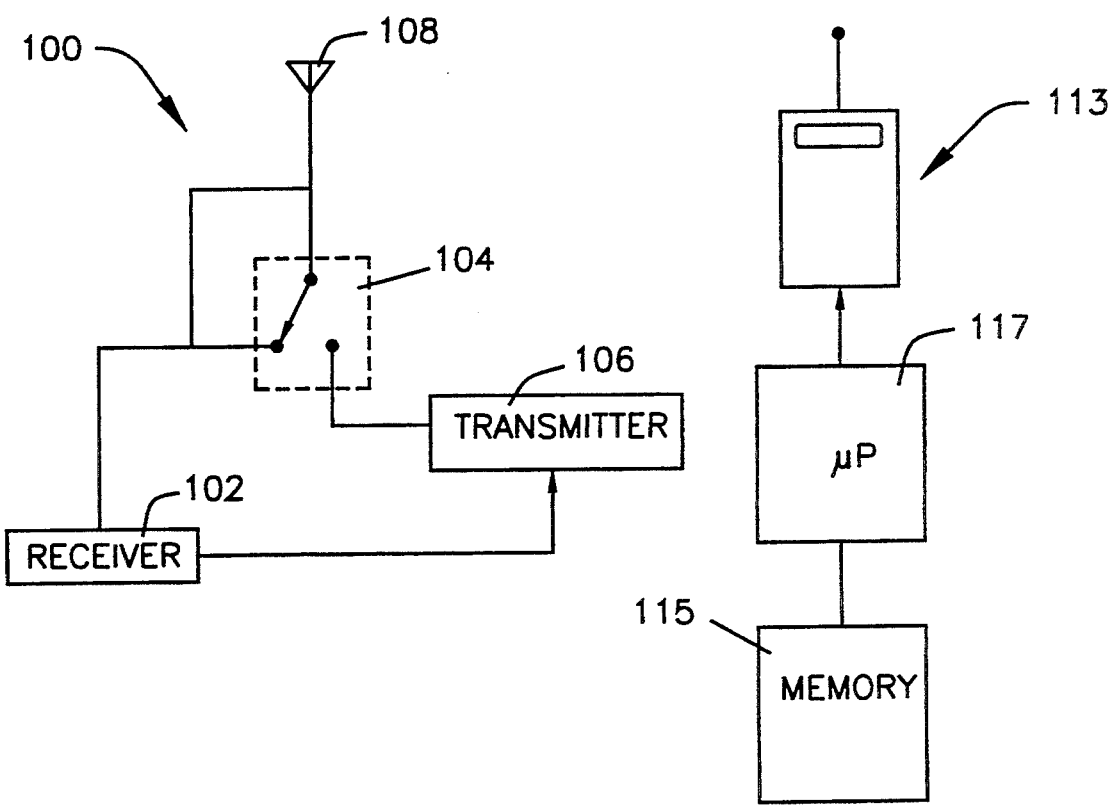
FIG. 5 is a schematic diagram of the components of the identification unit and transmitter/receiver unit in accordance with another embodiment of the present invention.

As discussed earlier, the receiver and decoder unit 13 may be modified to transmit a signal that requests one or more identification units to transmit respective identification signals even in the absence of a dangerous condition. An alternate embodiment of the present invention is illustrated in FIG. 5. In the modified identification unit 100 of the alternate embodiment, the decoder means and condition sensing means are omitted and the unit 100 is adapted to transmit only in response to an interrogation signal generated by remote transmitter unit 113. The transmitter unit 113 is preferably provided with a suitable memory means 115 for storing the code label of each type of material in accordance with a material identification system such as the 8-bit binary code system described above. The transmitter unit 113 is also equipped with a suitable microprocessor 117 which retrieves successive code labels from memory in accordance with a predetermined routine.

A pulsed interrogatory signal corresponding to each retrieved code label is transmitted by the transmitter unit 113 in a known manner until the identification unit 100 responds thereto. For this purpose, the identification unit 100 includes a receiver means 102 which, in a conventional manner, receives the interrogation signal via antenna 108 and changes the state of switch 104 to closed when the interrogation signal corresponds to the specific code label of the material being stored in the associated container. Upon the closure of switch 104, transmitter means 106 is energized to transmit a response signal which is received and processed by the transmitter unit 113, thereby establishing the contents of the container associated with identification unit 100.

The transmitter unit 113 may, if desired, be a single transportable device operable in close proximity to the identification units. As such, the identification units 100 may be configured to transmit over a very short range, such as one meter or less so that the transmitter unit could be operated in a hand-held manner to perform self-test or to enable regulatory personnel to conduct a spot check. Alternately, however, the microprocessor means 117 and memory means of the transmitter unit 113 might be provided at a central location while individual handheld units adapted to communicate therewith might simply be provided with means to relay the interrogation signal and response signal therebetween. The primary transmitter found in the container may be reprogrammed should the contents of the container not correspond with the ID in the memory. This may be accomplished through the application of a handheld computer used by registered and authorized reprogrammer personnel.

Although the present invention has been described with reference to particular embodiments, workers skilled in the art will recognize that changes may be made in form and detail without departing from the spirit and scope of the invention.

What is claimed is:

1. An identification device for use with a container that defines a cavity for retaining a material therein, said container having a dispensing opening, said identification device comprising:

sensing means, positionable within said cavity, for sensing a condition within said container that exceeds a predetermined threshold;

sealing means for sealing said dispensing opening, wherein said sensing means is coupled to said sealing means and is adapted to be positioned in said cavity when said sealing means is positioned in said dispensing opening: and signal means, coupled to said sensing means, for generating an identification signal that identifies said material stored in said cavity in response to said sensing means sensing said condition.

2. The identification device of claim 1, wherein said sensing means senses a temperature associated with said material in said cavity when said temperature exceeds a predetermined temperature limit.

3. The identification device of claim 2, wherein said sensing means includes a thermistor.

4. The identification device of claim 1, wherein said sensing means senses a rate of temperature rise associated with said material in said cavity when said rate of temperature rise exceeds a predetermined rate.

5. The identification device of claim 1, wherein said sensing means senses a pressure associated with said material in said cavity when said pressure exceeds a predetermined pressure limit.

6. The identification device of claim 1, wherein said signal means includes encoder means for providing a code label signal that identifies said material in the container.

7. The identification device of claim 6, wherein said code label signal includes an 8-bit binary code.

8. The identification device of claim 6, wherein said identification device further comprises transmitting means responsive to said code label signal for transmitting said identification signal.

9. The identification device of claim 1, wherein said identification signal is a microwave signal.

10. A system for identifying material being stored in at least one container, each container defining a cavity for storing the material and having an opening for dispensing the material into said cavity, said system comprising:

first transmitting means, external to said container, for wirelessly transmitting an interrogation signal towards said container;

receiving means, disposed within said container, for receiving said interrogation signal;

second transmitting means, disposed within said container, for wirelessly transmitting an identification signal that identifies the material being stored;

sensing means, coupled to said second transmitting means, for sensing a condition within each said container that exceeds a predetermined threshold, and;

mounting means for coupling said second transmitting means to said container, wherein said second transmitting means wirelessly transmits said identification signal when said interrogation signal received by said receiving means corresponds to the material being stored in said container or when said condition in excess of said predetermined threshold is sensed.

11. The system according to claim 10, wherein said first transmitting means includes storage means for storing a plurality of codes with each said code indicative of a particular material.

12. A method for identifying a substance stored within at least one container when a predetermined environmental condition within said container arises, comprising the steps of:

sensing said predetermined environmental condition via a sensor positioned within said container;

generating an identification signal indicative of the substance when the predetermined environmental condition within the container is sensed;

automatically, wirelessly transmitting said identification signal via an antenna coupled to said sensor; and receiving said identification signal at a location remote from said container.

13. The method according to claim 12 wherein said predetermined environmental condition is a temperature that exceeds a given threshold.

14. The method according to claim 12 wherein said predetermined environmental condition is a pressure in excess of a given threshold.

15. The method according to claim 12, further comprising the step of:

wirelessly transmitting an interrogation signal from an external source;

receiving said interrogation signal via a receiver positioned within said container; and generating said identification signal indicative of said substance upon said receiving of said interrogation signal.

* * * * *